United States Patent [19]

Roberts

[11] 4,141,437
[45] Feb. 27, 1979

[54] SHOE HOLD-DOWN SPRING FOR A DRUM BRAKE

[75] Inventor: James K. Roberts, South Bend, Ind.

[73] Assignee: The Bendix Corporation, Southfield, Mich.

[21] Appl. No.: 830,952

[22] Filed: Sep. 6, 1977

[51] Int. Cl.² ............................................. F16D 51/18
[52] U.S. Cl. ................................................... 188/340
[58] Field of Search ................. 188/340, 341, 78, 335, 188/337, 73.5; 267/58, 155

[56] References Cited

U.S. PATENT DOCUMENTS

| | | | |
|---|---|---|---|
| 2,263,949 | 11/1941 | Harle | 188/340 |
| 2,351,114 | 6/1944 | Freeman | 188/78 |
| 2,557,820 | 6/1951 | Frank | 188/78 |
| 2,609,212 | 9/1952 | McMurtrie | 267/58 |
| 2,796,954 | 6/1957 | Kaiser | 188/78 |
| 3,308,909 | 3/1967 | Johannesen | 188/340 |
| 3,869,027 | 3/1975 | Chlebowski | 188/340 |
| 4,055,237 | 10/1977 | Numazawa et al. | 188/73.5 |

FOREIGN PATENT DOCUMENTS 1246418  9/1971  United Kingdom ..................... 188/340

Primary Examiner—Edward R. Kazenske
Attorney, Agent, or Firm—Paul David Schoenle; Ken C. Decker

[57] ABSTRACT

A drum brake includes a backing plate for supporting a pair of brake shoes and a hydraulic actuator is operable to move the pair of brake shoes into a braking position. A coil spring and a finger cooperate to juxtaposition one of the pair of brake shoes adjacent to the backing plate. The coil spring includes end projections that are biased against the one brake shoe and an intermediate portion of the coil spring forms a loop which releasably locks with a hook on the finger to yieldably maintain the one brake shoe adjacent to the backing plate. The loop and finger cooperate to form an abutment which limits the separation between the one brake shoe and the backing plate.

1 Claim, 3 Drawing Figures

SHOE HOLD-DOWN SPRING FOR A DRUM BRAKE

BACKGROUND OF THE INVENTION

It is well known in the art to use coil springs for the purpose of attaching a pair of brake shoes to a backing plate. For example, U.S. Pat. Nos. 3,958,674 and 3,517,779 show a pair of coil springs cooperating with respective brake shoes to yieldably retain the respective brake shoes in attachment with the backing plate.

It is clear from these references that, except for the resistance force of the coil spring, there is no limit to the axial separation between the brake shoes and the backing plate. Consequently, if the pair of brake shoes sticks to the drum upon the latter's removal from the drum brake assembly, the coil springs will stretch beyond their elastic range, thereby rendering the function of the coil springs inoperable.

SUMMARY OF THE INVENTION

The present invention relates to a drum brake assembly and the manner of attaching a pair of brake shoes to a backing plate on the drum brake assembly. In particular, the backing plate supports a hydraulic actuator via the pair of brake shoes and the hydraulic actuator is operable to move the pair of brake shoes into a braking position. In order to permit radial as well as limited axial movement of the pair of brake shoes relative to the backing plate, a coiled spring releasably locks with a finger to yieldably attach each brake shoe to the backing plate.

The coiled spring includes an intermediate portion forming a loop which releasably locks with a hook on the finger to position the coiled spring against a rim and a web of each brake shoe. The finger connects with the backing plate to urge the coiled spring to twist in one direction and projections extending from the cylinder portion of the coiled spring abut the web to oppose twisting in the one direction. To prevent movement of the coiled spring away from the web, the rim includes tabs which extend radially therefrom and oppose movement of the coiled spring in the axial direction. In accordance with the invention the loop and finger releasably lock to form an abutment which opposes and is engageable with the web to limit axial movement of the web of each brake shoe relative to the backing plate.

DETAILED DESCRIPTION

Figure 1:
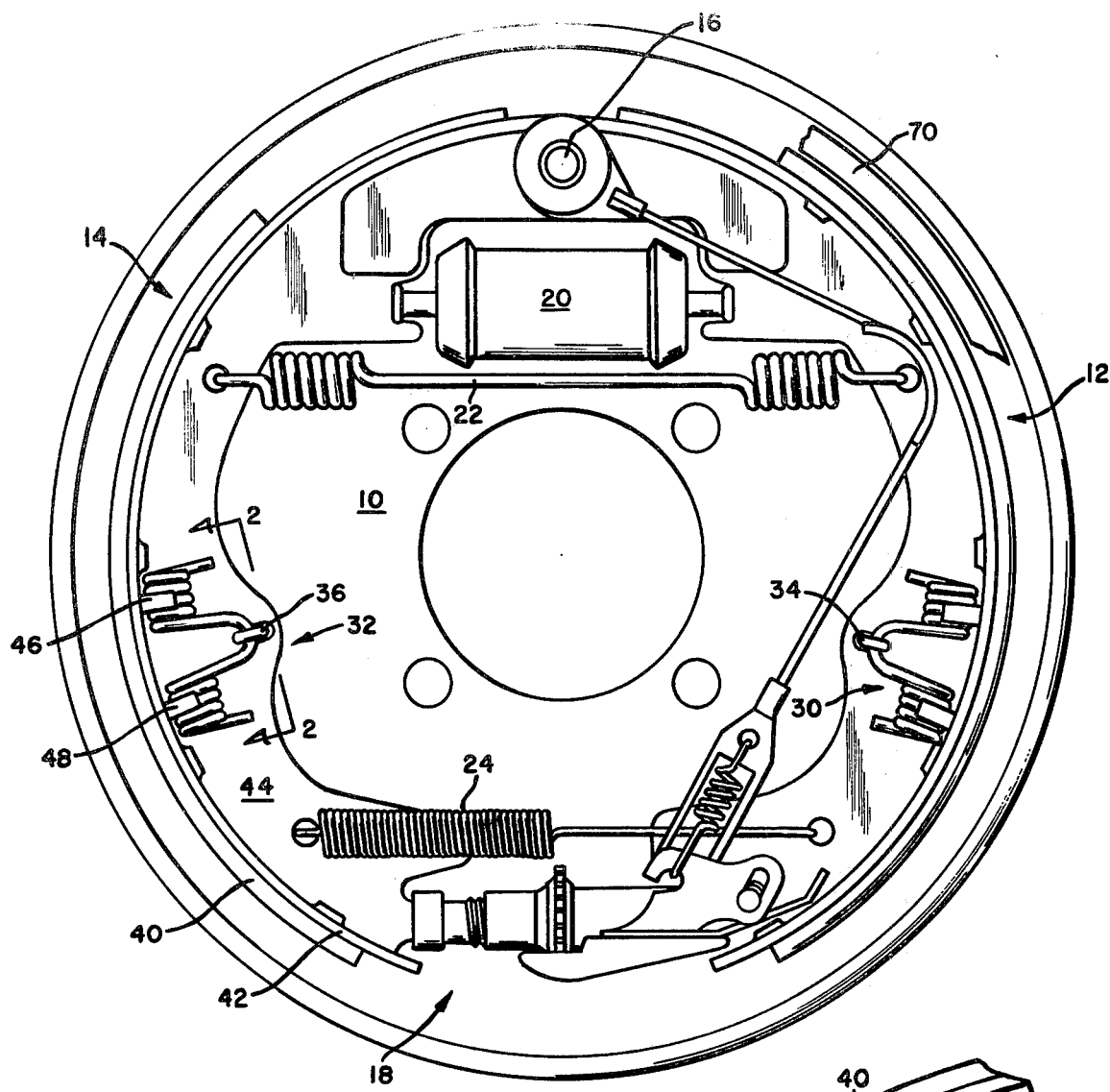
FIG. 1 is a side elevational view of a drum brake made pursuant to the teachings of my present invention.
Figure 2:
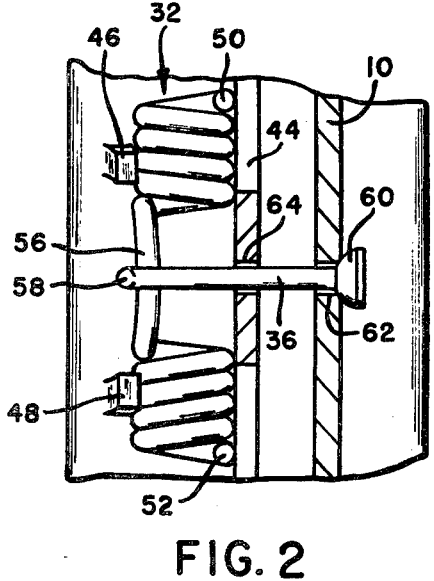
FIG. 2 is an enlarged cross-sectional view taken substantially along line 2—2 of FIG. 1.

The drum brake assembly of FIG. 1 includes a backing plate 10 which carries a pair of brake shoes 12, 14 by means of a pin 16. An adjustment mechanism 18 is disposed between the brake shoes 12, 14 opposite the pin 16 and a hydraulic actuator 20 between the brake shoes 12, 14 is operable to urge the brake shoes to move radially outwardly into a braking position. Return springs at 22 and 24 cooperate with the brake shoes to return the same to the nonbraking position illustrated in FIG. 1 when the hydraulic actuator 20 ceases to operate, as is well known in the art.

In accordance with the invention, coiled springs at 30 and 32 cooperate with fingers 34 and 36, respectively to yieldably retain the brake shoes in axial close proximity to the backing plate 10. As the right coiled spring 30 is a mirror image of the left coiled spring 32, the following description with respect to the left coiled spring 32 is equally applicable to the right coiled spring 30.

The brake shoe 14 comprises a friction lining 40 which is bonded to a rim 42 and a web 44 extends perpendicular from the rim 42. Tabs at 46 and 48 extend substantially parallel to the web 44 and the coiled spring 32 is disposed between the tabs 46 and 48 and the web 44.

Figure 3:
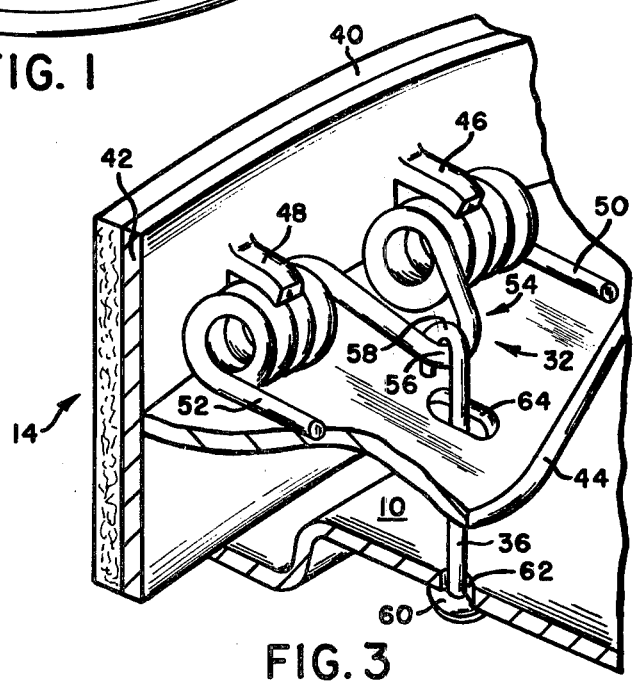
FIG. 3 is a perspective view of the cross-sectional view of FIG. 2.

In the preferred embodiment of the invention illustrated in FIG. 3, the coiled spring 32 terminates in projections 50 and 52 which extend along the surface of the web 44. An intermediate portion at 54 forms a loop 56 which releasably locks with a hook 58 on the finger 36. As the finger 36 carries a washer 60 abutting the backing plate 10, the releasable locking between the hook 58 and loop 56 maintains the coiled spring 32 in rotational tension. With the projections 50, 52 and the loop 56 in rotational tension, the coiled spring biases the web 44 and brake shoe 14 axially towards the backing plate 10.

Extending from an opening 62 on the backing plate 10, the finger 36 also extends through a slot 64 on the web 44 to releasably lock with the loop 56. It is important to note that the loop 56 formed by the intermediate portion 54 is wider than the slot 64 so that the loop 56 is engageable with the web 44 to form an abutment, thereby limiting the axial movement of the brake shoe 14 away from the backing plate 10.

Although during normal braking, the pair of brake shoes may not be urged axially away from the backing plate 10, removal of a drum 70 may impart axial movement to the pair of brake shoes away from the backing plate 10. With the loop 56 abutting the web 44 of brake shoe 14, the removal of the drum 70 will not over stress the coiled spring 32 beyond its rotational elastic range.

In an alternate embodiment (not shown) it is possible to provide a pair of openings in the brake shoe web 44 and to bend the projections 50 and 52 into the openings for positioning the coiled spring 32 relative to the brake shoe web 44. This alternative provides for the elimination of the tabs 46 and 48.

In conclusion the drum brake assembly of the present invention provides for limited axial, as well as radial movement of the pair of brake shoes relative to the backing plate. Moreover, the coiled spring retained by each brake shoe forms an abutment to limit the axial movement between the backing plate and the brake shoe.

I claim

1. In a drum brake having a backing plate supporting a pair of brake shoes, each of the brake shoes including a web and a rim with a friction lining attached to the rim, an actuator cooperating with the pair of brake shoes to move the latter to a braking position and resilient means cooperating with the backing plate and at least one of the pair of brake shoes to maintain the latter in juxtaposition to the backing plate, the improvement wherein said resilient means comprises a coil spring engaging the one brake shoe and a finger member extending from the backing plate and projecting through an opening in said web, said coil spring including a pair of projections extending from opposite ends of said coil spring and engaging the web of the one brake shoe, and a pair of coiled portions having axes extending generally parallel to the plane of said web, said coiled portions defining an outer circumferential surface of said coil spring, and a loop joining said coiled portions and projecting tangentially from said outer circumferential surface, said loop releasably locking with said finger member to impart rotational tension to said coil spring to torque siad coiled portions to bias said end projections into engagement with the web of the one brake shoe to resiliently oppose separation of the one brake shoe away from the backing plate, said finger member cooperating with said loop to limit separation of the one brake shoe away from the backing plate, the rim of the one brake shoe including tabs extending outwardly from the rim of the one brake shoe to engage said outer circumferential surface of said coil spring to hold said outer circumferential surface of said coil spring in engagement with the web of the one brake shoe and said tabs also retaining said end projections parallel to and in engagement with the web of the one brake shoe.

* * * * *